United States Patent [19]

Pohlenz et al.

[11] Patent Number: 4,811,307

[45] Date of Patent: Mar. 7, 1989

[54] TONPILZ TYPE PIEZOELECTRIC TRANSDUCER CAPABLE OF OPERATING ALTERNATELY AS WIDEBAND RECEIVER AND EMITTER

[75] Inventors: Charles Pohlenz, Six Fours les Plages; Didier Boucher, Le Brusc; Bernard Tocquet, Sanary, all of France

[73] Assignee: L'Etat francais represente par le Delegue General pour l'Armement, Paris, France

[21] Appl. No.: 861,704

[22] Filed: May 12, 1986

[30] Foreign Application Priority Data

May 10, 1985 [FR] France ............................ 85 07081

[51] Int. Cl.[4] ........................ H04B 1/06; H04B 1/02

[52] U.S. Cl. ................................ 367/135; 367/137; 367/158; 310/337

[58] Field of Search ............... 367/135, 157, 158, 137; 310/337

[56] References Cited

U.S. PATENT DOCUMENTS

| | | | |
|---|---|---|---|
| 3,835,254 | 9/1974 | Ohasi et al. | 367/158 |
| 3,860,901 | 1/1975 | Ehrlich et al. | 367/157 |
| 3,982,425 | 9/1976 | McLain | 367/137 |
| 4,031,418 | 6/1977 | Cluzel et al. | 367/158 |
| 4,100,527 | 7/1978 | Tocquet | 367/150 |
| 4,319,345 | 3/1982 | Dennis | 367/158 |
| 4,353,004 | 10/1982 | Kleinschmit | 367/903 |
| 4,373,143 | 2/1983 | Lindberg | 367/158 |
| 4,464,738 | 8/1984 | Czajkowski | 367/97 |
| 4,480,324 | 10/1984 | Sternberg | 367/150 |

*Primary Examiner*—Thomas H. Tarcza
*Assistant Examiner*—Daniel T. Pihulic
*Attorney, Agent, or Firm*—Parkhurst, Oliff & Berridge

[57] ABSTRACT

A Tonpilz type piezoelectric transducer which can be used alternately as a wide-band receiver and an emitter includes a stack of pairs of piezoelectric segments separated by electrodes, the stack being placed between a horn and a countermass. An emitter is connected by a conductor to one of the two electrodes for each segment pair. One pair of segments next to the countermass is separated from the others by an insulator. The two electrodes to either side of the one pair are connected in parallel to a receiver and, through two diodes connected in opposition, to a grounded common conductor.

6 Claims, 4 Drawing Sheets

TONPILZ TYPE PIEZOELECTRIC TRANSDUCER CAPABLE OF OPERATING ALTERNATELY AS WIDEBAND RECEIVER AND EMITTER

BACKGROUND OF THE INVENTION

The present invention discloses a single Tonpilz type piezoelectric transducer which can be used alternately as an emitter for emitting at one or more resonant frequencies and as a wide-band receiver.

1. Field of the Invention

This invention relates to sonar structures.

High power sonar emitter antennas are generally built with an array of Tonpilz type transducers, which comprise a drive consisting of a stack of piezoelectric segments placed between a horn, which is in contact with the water, and a countermass.

In the emission mode, these transducers are excited by an electronic emitter, which emits an oscillating signal of several thousand volts at one or more clearly defined frequencies which are the resonant frequencies of the transducers.

It is advantageous to be able to use the same sonar antennas alternately as emitting and receiving antennas for picking up sound waves, e.g., for detecting the presence of a ship. However, the waves to be received may come in at any sound frequency. If a receiving antenna is to offer acceptable performance, then it must be able to receive sound waves with good sensitivity throughout a broad frequency band covering practically the entire usable band of sound frequencies, i.e., from 1 kHz to 16 kHz.

2. Description of the Prior Art

One solution has been described in a previous patent application (which issued as French Pat. No. 3,570,916, and to which U.S. application Ser. No. 640,145 corresponds), whereby a multifrequency Tonpilz type transducer was obtained for emitting and receiving in several passbands, by placing phase shifting circuits between the piezoelectric segments and the common conductor through which the excitation or output voltage flows, and switching these circuits by means of a logic unit, to the desired passbands.

A main disadvantage of this previous solution was that it calls for complex devices. Also, it allows only several separate passbands to be obtained, separated by frequency bands in which the transducer's sensitivity is poor, and such a transducer does not make it possible to construct receiving antennas covering a very wide band including nearly all the usable sound frequencies, with a good sensitivity.

Furthermore, the known antennas used for emitting and receiving must include switches to isolate the emitter or receiver, alternately.

OBJECT OF THE INVENTION

The object of the present invention is to obtain relatively simple means by which the same Tonpilz type transducers can be used to make up sonar antennas that can be used either as emitter antennas in one or more clearly defined resonant frequencies or as receiving antennas with a wide passband that includes practically all of the useful frequencies, without having to use switches.

SUMMARY OF THE INVENTION

Accordingly, the invention provides a process by which at least one piezoelectric segment in the aligned stack of segments of a Tonpliz piezoelectric transducer is connected to an electronic receiver and to ground, through two diodes mounted in opposition.

In accordance with the present invention, a Tonpilz type piezoelectric transducer includes at least one piezoelectric segment placed in the stack of segments between the countermass and the horn, and between two electrodes, one of which is connected to the ground and the other in parallel to an electronic receiver and to the ground through two diodes mounted in opposition.

In a first embodiment, the piezoelectric transducer stack according to the invention includes a plurality of identical piezoelectric segment pairs and the electrodes of all the segment pairs except one are connected in parallel alternately to a common conductor connected to an emitter and to a common collector ground. The electrode between the two segments of the last pair is connected to the common conductor connected to an emitter and the two electrodes to either side of the last pair are connected in parallel to an electronic receiver and, through two diodes mounted in opposition, to the common collector ground. The last pair is separated from the neighboring pair and from the countermass by an insulator. Preferably, the last pair is the one adjacent to the countermass.

According to another embodiment, a transducer according to the invention includes a pair of piezoelectric segments, that are thinner than emitter segments and, which is placed between the countermass 3 and the stack of emitter segments. The electrode located between the two thinner segments is connected to an electronic receiver and to ground through two diodes mounted in opposition, and the two electrodes to either side of the pair of thinner segments are connected to ground.

The invention results in transducers of the Tonpilz type that can be used in constructing sonar antennas and which can be employed either as high-power emitting antennas emitting at one or more clearly determined resonant frequencies, or as receiving antennas having a wide frequency band.

Measurements have shown that a transducer according to the invention in which only the pair of segments adjacent to the countermass is used in the reception mode has a good reception sensitivity that remains roughly uniform throughout a frequency range between 2 kHz and 14 kHz and can thus be used in making receiving antennas.

In addition, the construction cost, the dimensions and the weight of an emitter-receiver antenna according to the invention are roughly the same as those of an emitter antenna having the same performance characteristics in emission mode.

BRIEF DESCRIPTION OF THE DRAWING

The following description refers to the attached drawing which shows exemplary embodiments of the present invention without being limiting in nature.

DESCRIPTION OF THE PREFERRED EMBODIMENTS

Figure 1:
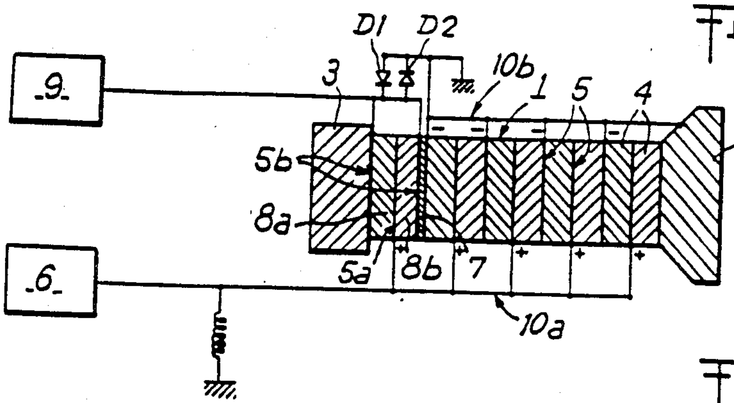
FIG. 1 is a schematic representation of a transducer according to the invention.

FIG. 1 shows a Tonpilz type piezoelectric transducer consisting of a drive element placed between a horn 2 and a countermass 3. The drive consists of a stack 1 of identical piezoelectric segment pairs 4, separated by electrodes 5.

Such a transducer is used as an element in a sonar emitter antenna. For such purposes, the positive electrodes located between the two segments of each pair are connected in parallel by a conductor 10*a* to the output of an electronic oscillator 6, while the negative electrodes to either side of the segments of each pair are connected in parallel to ground by a conductor 10*b*.

Such a "resonating" transducer is used by emitting in clearly determined frequencies corresponding to resonant frequencies.

It is not possible to use such a transducer to construct a sonar receiving antenna for detecting sound waves over a wide band covering several octaves of audio frequencies.

The FIG. 1 shows schematically a circuit by which the same transducer can be used either as a high power resonating emitter or as a wide passband receiver.

To do this, one of the pairs of piezoelectric segments making up stack 1, and preferably pair 8*a*, 8*b* closest the countermass 8, is isolated electrically from the neighboring pair and from the countermass by a film or insulating layer 7 having an insulating power of only a few volts.

The two electrodes 5*b* to either side of the segment pair 8*a*, 8*b* are connected to an electronic receiver 9. They are also connected through two diodes D1, D2, oppositely connected in parallel, to a conductor 10*b*, which is grounded, and to which are connected in parallel the negative electrodes located between the pairs of segments other than pair 8*a*, 8*b*. The electrode 5*a* located between segments 8*a*, 8*b* is connected to conductor 10*a*.

The circuit operates as follows.

When emitting, the oscillator 6 emits an oscillating voltage of the order of one kilovolt. The voltage drop in the two diodes D1 and D2, which is of the order of one volt, is negligible compared with the excitation voltage and all of the segment pairs of the drive are electrically excited.

When receiving, the horn 2 receives the waves, which oscillate the set of piezoelectric segment pairs. Only the oscillating voltage generated by the segment pair 8*a*, 8*b* is detected, which is a voltage on the order of a microvolt and which thus cannot pass through the diodes D1 and D2, and is thus sent directly to the receiver 9. In reception mode, the diodes D1 and D2 thus automatically disconnect the pair 8*a*, 8*b* which is used as a receiver, from the rest of the piezoelectric drive, which is used in emission mode.

FIG. 1 shows a preferred example in which the segment pair 8*a*, 8*b* closest the countermass is used for reception. It is specified that another pair of segments located elsewhere in the stack could also be used for reception, or even a couple composed of several pairs of piezoelectric segments.

However, experience shows that it is of great advantage in reception mode to use the segment pair closest the countermass because it is this pair that exhibits the most uniform sensitivity curve over a bandwidth extending the three octaves from 2 kHz to 16 kHz.

Figure 2:
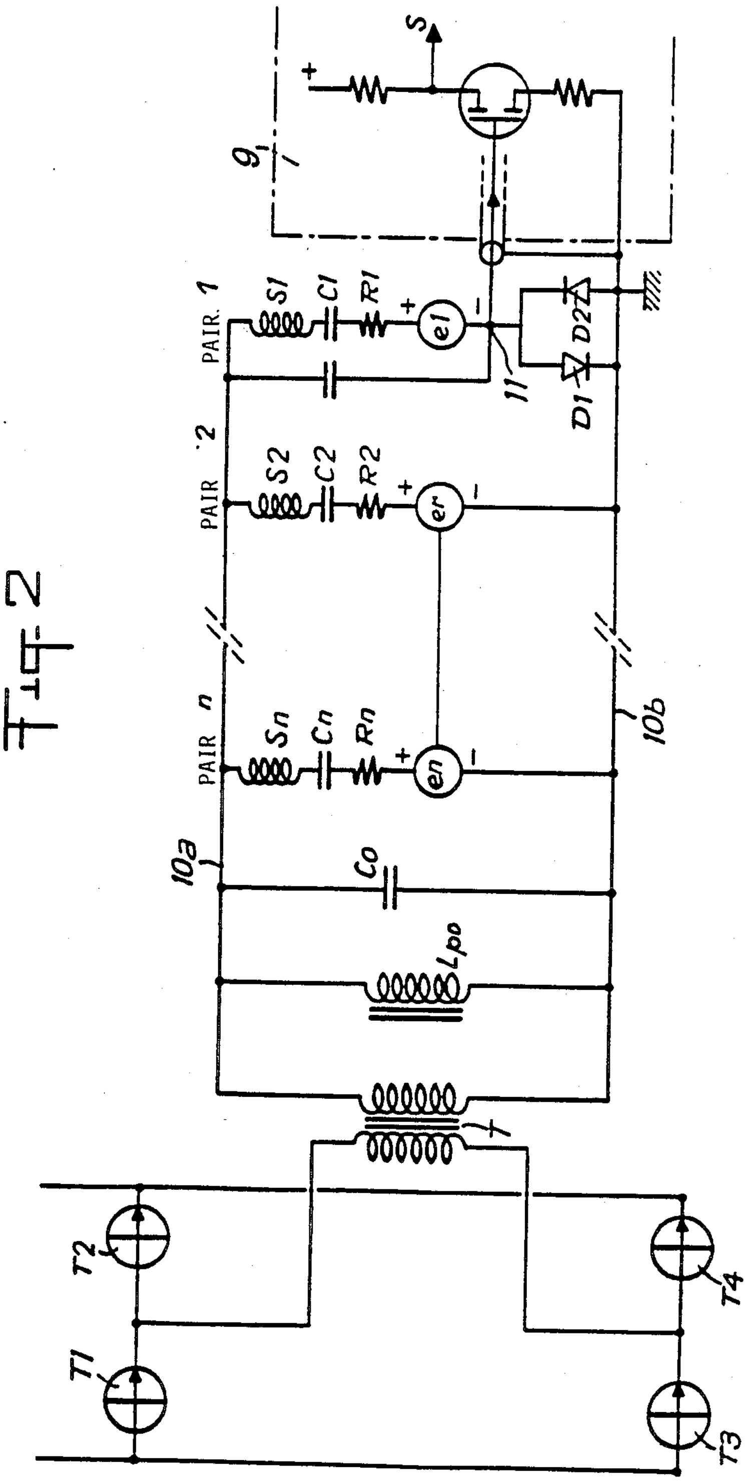
FIG. 2 is a schematic diagram of the equivalent electric circuit for the transducer shown in FIG. 1.

FIG. 2 diagrams the equivalent electrical circuits of a device constructed according to FIG. 1.

In this diagram, the pairs of piezoelectric segments, numbered 1 to n going from the countermass to the horn, are shown in the equivalent form of a voltage generator e1, e2, . . . en mounted in series with an impedance consisting of a coil S1, S2, . . . Sn, one capacitor C1 to Cn and one resistor R1 to Rn. The capacitor Co represents the blocked capacitance equivalent to the capacitances of the segment pairs 1 to n. The coil Lpo is an impedance matching coil.

The pairs 2 to n are mounted in parallel between the conductors 10*a* and 10*b*, which are connected to the secondary terminals of the coupling transformer T, the primary of which is connected to the output of an oscillator including the transistors T1, T2, T3 and T4, mounted in a switch at H. When this oscillator is not oscillating, its output is shunted through potentially conductive transistors T2 and T4.

On the right side of FIG. 2 is a pair 1 of piezoelectric segments, which is the pair 8*a*, 8*b* in FIG. 1 and which is represented by its schematic equivalent e1, R1, C1, S1, mounted in parallel with a capacitor Co.

The pair 1 is connected to conductor 10*a* and, through the two diodes D1 and D2, to conductor 10*b*. The midpoint 11 between the two diodes and the pair is connected by a shielded cable to an electronic receiver 9.

When the transducer is operating as an emitter, all of the pairs 1 to n are excited and the receiver 9 receives only a voltage equal to the voltage drop in diodes D1 and D2, which it can withstand.

It is therefore not necessary to have a switch to disconnect it. When the transducer operates as a receiver, the conductor 10*a* is grounded through the secondary winding because the oscillator is shunted and the receiver receives the oscillating voltage generated by pair 1, while the voltages generated by the other pairs are stopped by diodes D1 and D2. The diagram according to FIG. 2 shows that, in the case where the emitter 6 is of the type including switches at H, which shunts itself when the oscillator is not oscillating, the same pair can be used alternately as emitter and as receiver without it being necessary to provide a switch to disconnect the electronic circuits of the emitter and receiver, alternately.

FIGS. 1 and 2 show a device in which piezoelectric segment pair 1, located next to the countermass, is used alternately to emit and to receive.

This embodiment provides the advantage that pair 1 is used for emission, but requires that pair 1 be identical to the other pair of segments.

Figure 3:
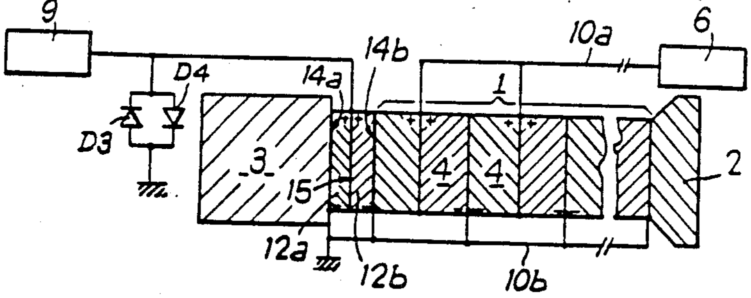
FIGS. 3, 4 and 5 are schematic representations of variant embodiments according to the invention.

FIG. 3 shows a variant embodiment.

The FIG. 3 embodiment is also a resonating transducer of the Tonpilz type with a drive 1, horn 2 and countermass 3.

In this embodiment, the stack of piezoelectric segments 1 includes, in addition to the stack of segment pairs 4 constituting the emitter drive, one or more pairs of piezoelectric segments 12*a*, 12*b* adjust the countermass which are thinner than the other segments.

The positive electrodes located between two segments of the same pair 4, and the negative electrodes located to either side of each segment pair 4, are connected in a known fashion parallel to two conductors 10*a*, 10*b*. The conductor 10*b* is grounded. The conductor 10*a* is connected to an electronic emitter 6.

The segment pair 12*a*, 12*b* includes two negative electrodes 14*a*, 14*b* located on either side of the pair, which are connected to the ground, and one positive electrode 15 which is located between the two segments and which is connected to a receiver 9. Although the segments 12*a*, 12*b* are distinct from the emitter segments 4, they do not constitute a hydrophone separate from the emitter because the two interact. During emission, the emitter segments 4 deform while oscillating, compressing and releasing segments 12*a*, 12*b*, which then emit a relatively high oscillating voltage which would damage receiver 9 if transmitted to it. To avoid this risk without having to use a switch to disconnect the receiver during emission, two diodes D3 and D4 are connected in opposition between the input of receiver 9 and ground so that the voltage at the receiver terminals is limited to the diode threshold voltage.

Figure 4:
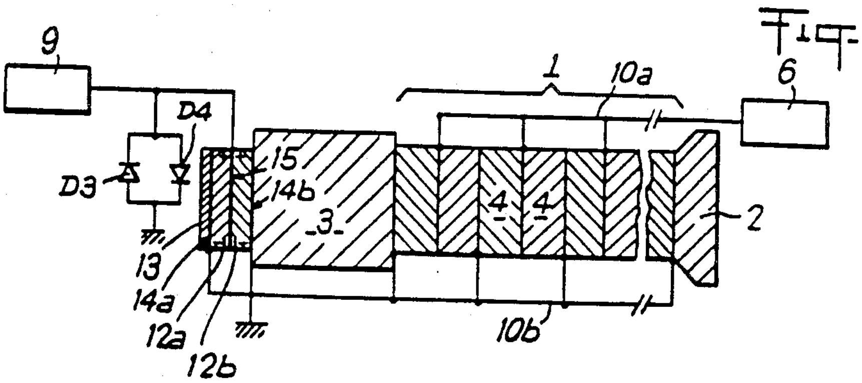

FIG. 4 shows a variation of the embodiment shown in FIG. 3. The corresponding elements are represented by the same item numbers in both figures.

In this variation, a pair of piezoelectric segments 12*a*, 12*b*, mounted in opposition, is added to the other side of countermass 3 of a Tonpilz type resonating transducer. The electrode 15 located between the two segments 12*a* and 12*b* is connected to a receiver 9 and two diodes D3 and D4 are connected in opposition between the input of the receiver and ground. The electrodes 14*a* and 14*b* located to either side of the segments 12*a*, 12*b* are connected to ground.

Figure 5:
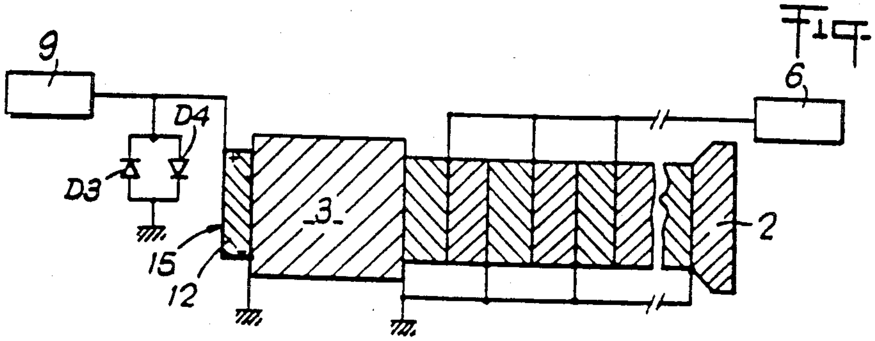

FIG. 5 shows a variation of the embodiment shown in FIG. 4 in which the pair of piezoelectric segments 12*a*, 12*b* is replaced with a single segment 12, which makes it possible to obtain in the reception mode an even flatter sensitivity curve and a larger passband.

Figure 6:
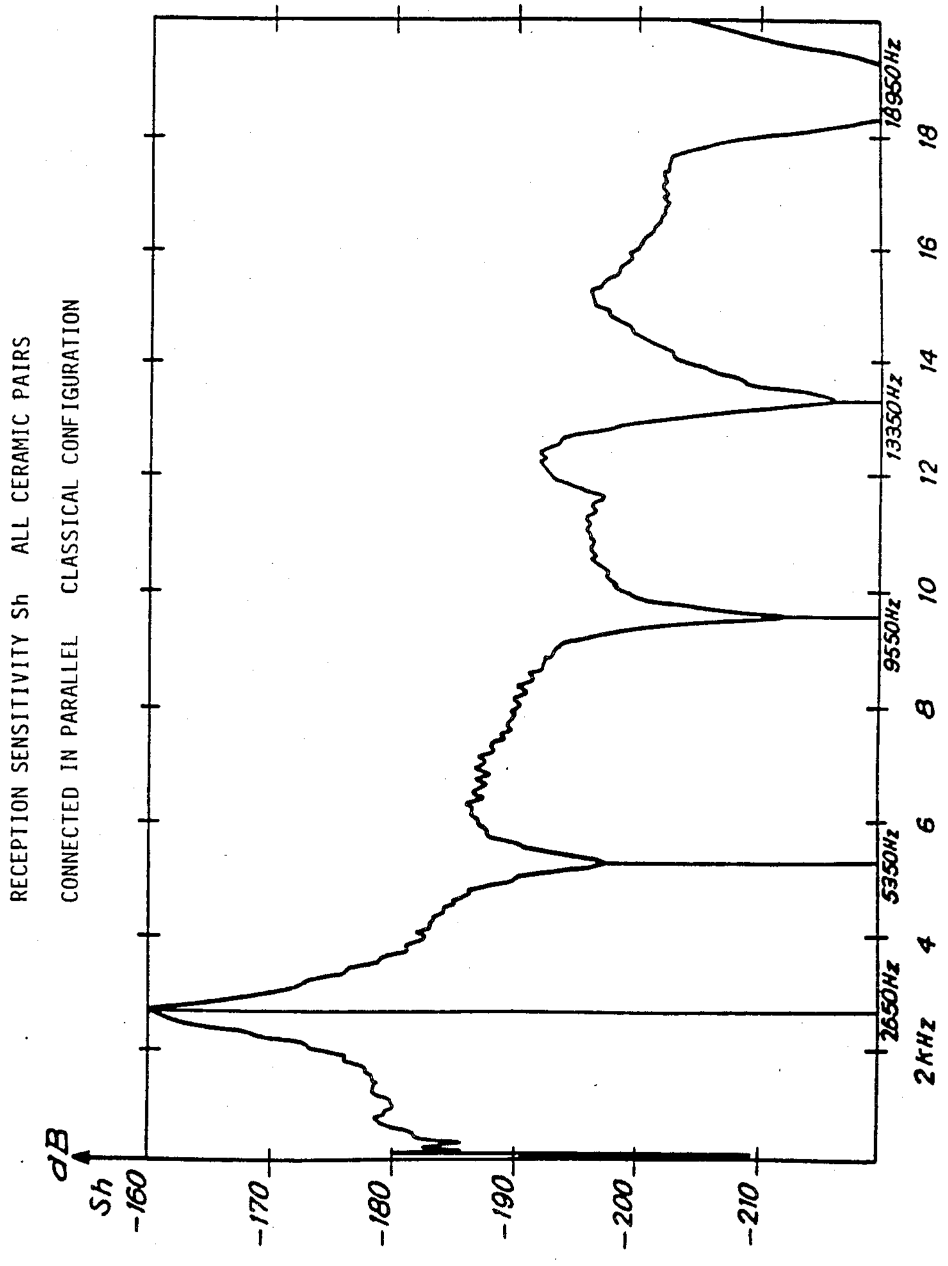
FIGS. 6 and 7 are graphs showing the reception mode sensitivity, respectively of a conventional Tonpilz type resonating transducer and of a transducer according to the invention.
Figure 7:
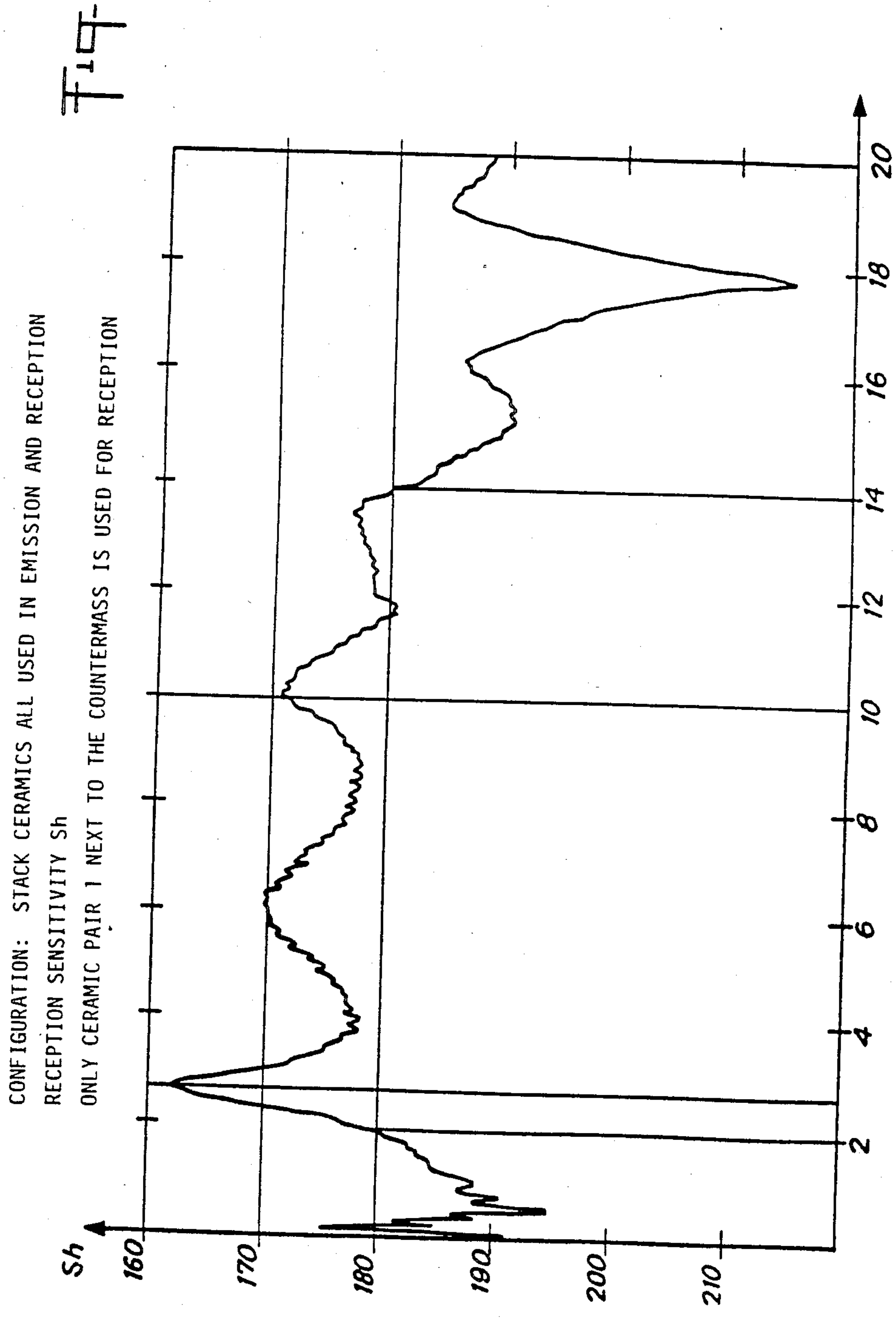

FIGS. 6 and 7 graph the sensitivity Sh expressed in decibels referenced to 1 V/$\mu$ Pa as a function of frequency, with the abscissa running from 0 to 20 kHz.

FIG. 6 is a sensitivity curve of a Tonpilz type resonating transducer in a conventional circuit, in which all of the ceramic pairs are connected in parallel. It is clearly seen in this figure that the sensitivity peaks very sharply at a frequency of 2650 Hz, which is a resonant frequency, and dips pronouncedly at frequencies of 5350 Hz, 9550 Hz, 12,350 Hz and 18,950 Hz. Such a transducer cannot be used in a wide-passband receiving antenna.

FIG. 7 shows the sensitivity curve in reception mode as measured on a Tonpilz transducer according to FIGS. 1 and 2, in which only the piezoelectric segments next to the countermass are used for reception. It is seen that throughout the frequency band going from 2 kHz to 14 kHz, a nearly uniform sensitivity Sb is obtained that is better than 180 db, and such a transducer can be used as a constituent part of a receiving antenna for detecting low frequency acoustical waves between 2 kHz and 14 kHz, which is the useful range in underwater applications.

FIG. 7 shows the sensitivity measured on a single transducer without any electronic damping circuit. The sensitivity curve of a receiving antenna made of a plurality of transducers and including damping circuits is even more uniform due to the smoothing effect of the antenna.

FIG. 7 represents the reception performance of a transducer constructed according to FIGS. 1 and 2 in which a pair of segments comprised in the emitter stack is used for reception.

Experience shows that even more uniform sensitivity curves are obtained if, in reception, a specific pair of thinner segments is used according to the variants described in FIGS. 3 and 4, or a single thinner segment according to the variant in FIG. 5.

The variants shown in FIGS. 4 and 5 also offer the advantage that they can be adapted to existing transducers and that they facilitate maintenance.

The variants according to FIGS. 3, 4 and 5 also offer the advantage that they can be used with an emitter of any type, whereas the variants according to FIGS. 1 and 2 can be used with external switch only in emitters including a switch at H that are shunted when they are not emitting.

What we claim is:

1. A tonpilz type piezoelectric transducer comprising:
   - a stack of pairs of piezoelectric segments;
   - a horn and a countermass disposed in alignment with said stack;
   - an electronic emitter for emitting one or more resonant frequencies;
   - electrodes separating said piezoelectric segments, the electrodes for all of said piezoelectric segments except not more than two segments being alternately connected in parallel to a first common conductor coupled to said emitter and to a second common conductor coupled to a ground, and at least one first electrode for said not more than two segments being connected with a receiver and through two diodes oppositely connected in parallel to said ground.

2. The transducer of claim 1 wherein said piezoelectric segment pairs are all identical and are all disposed between said horn and said countermass; an end piezoelectric segment pair adjacent said countermass constitutes said not more than two segments; insulating means electrically isolates said end piezoelectric segment pair from an adjacent pair in the stack and from said countermass; electrodes disposed on both sides of said end piezoelectric segment pair constitute said at least one first electrode; and the electrode separating the segments of said end piezoelectric segment pair is connected to said first common conductor.

3. The transducer of claim 1 wherein said piezoelectric segment pairs are all disposed between said horn and said countermass; an end piezoelectric segment pair adjacent said countermass constitutes said not more than two segments and the segments of said end piezoelectric segment pair are thinner than the segments of the piezoelectric segment pairs in said stack not constituting said end piezoelectric segment pair; electrodes disposed on both sides of said end piezoelectric segment pair are connected to said ground; and the electrode separating the segments of said end piezoelectric segment pair constitutes said at least one first electrode.

4. The transducer of claim 1 wherein said countermass is disposed between said not more than two segments and the piezoelectric segments in said stack not constituting said not more than two segments.

5. The transducer of claim 4 wherein an end piezoelectric segment pair constitutes said not more than two segments; electrodes disposed on both sides of said end piezoelectric segment pair are connected to said ground; and the electrode separating the segments of said end piezoelectric segment pair constitutes said at least one first electrode.

6. The transducer of claim 4 wherein a single piezoelectric segment constitutes said not more than two segments; an electrode disposed on a first side of said single piezoelectric element between said single piezoelectric segment and said countermass is connected to said ground; and an electrode disposed on a second side of said single piezoelectric segment constitutes said at least one first electrode.

* * * * *